United States Patent Office 3,091,235
Patented May 28, 1963

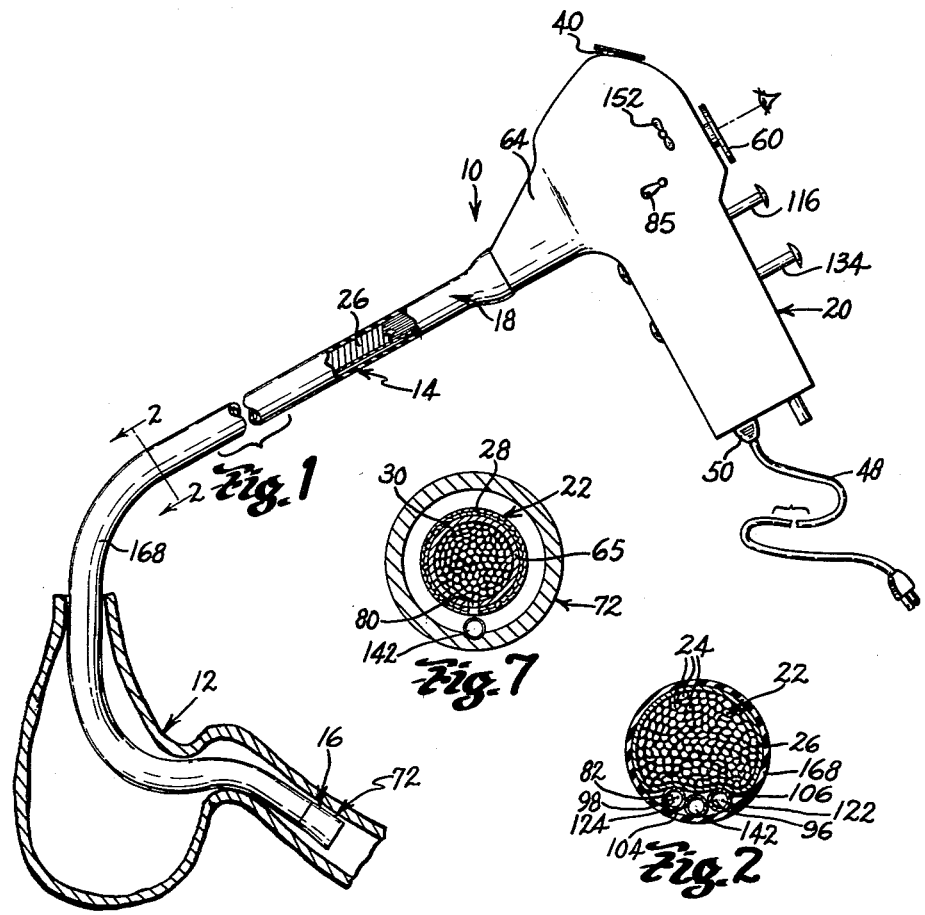
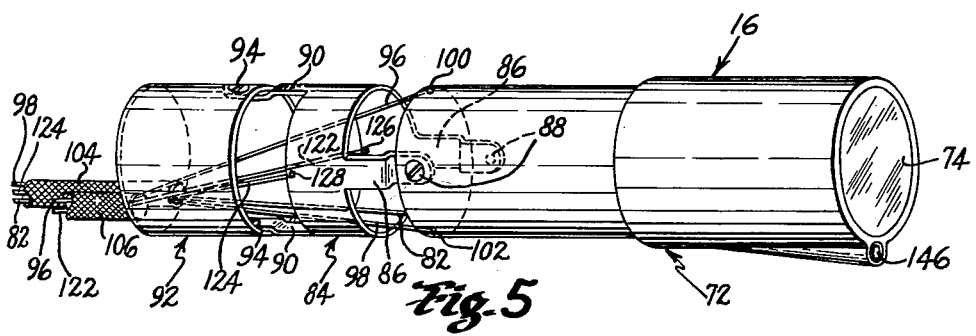

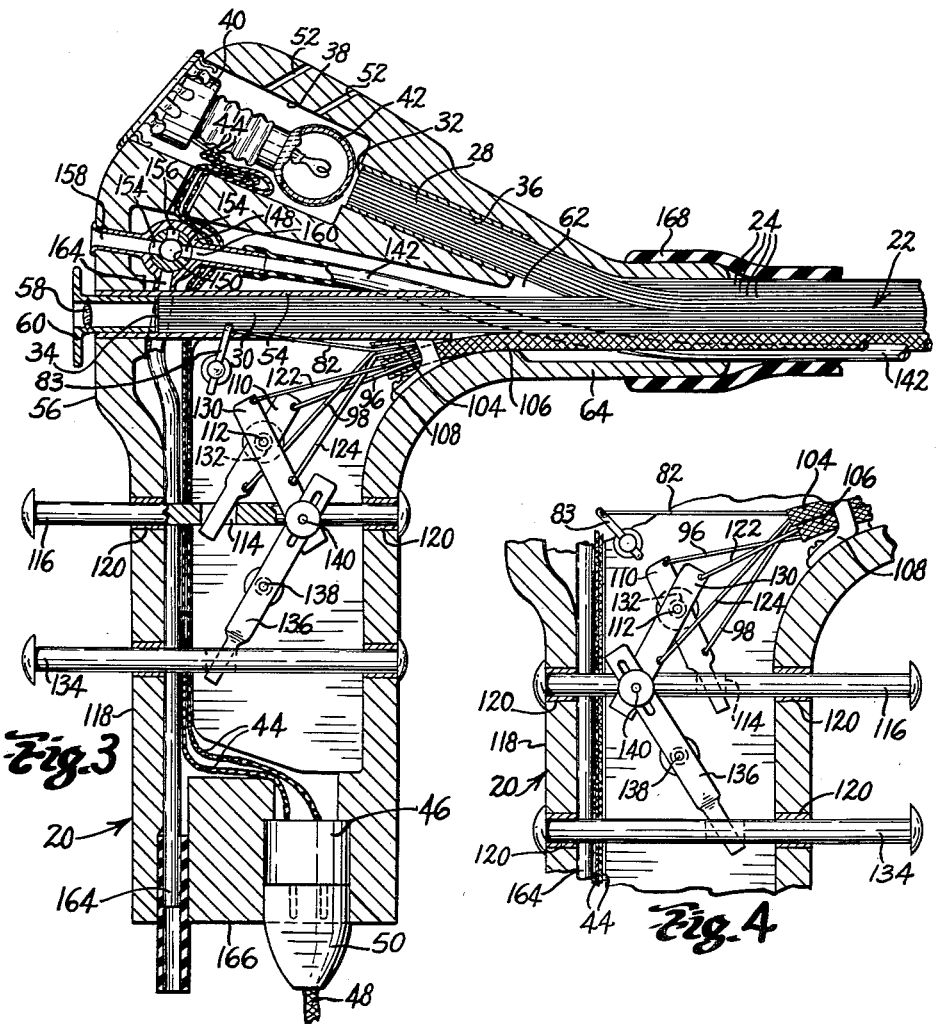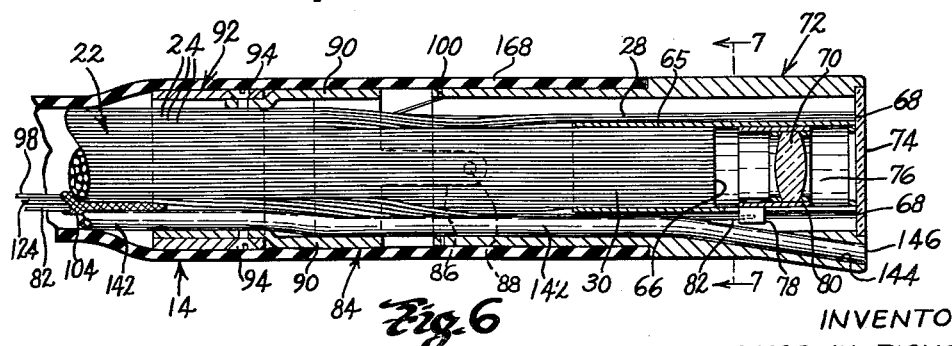

3,091,235
DIAGNOSTIC INSTRUMENTS
Oscar W. Richards, North Woodstock, Conn., assignor to American Optical Company, Southbridge, Mass., a voluntary association of Massachusetts
Filed June 15, 1960, Ser. No. 36,426
5 Claims. (Cl. 128—6)

This invention relates to diagnostic instruments of the type most commonly used for examination of the cavities of the body and has particular reference to an improved endoscopic type of instrument which may be utilized in the treatment and/or sampling of various body fluids or parts as well as for visual examination of normally inaccessible internal organs or passages of the body.

Due to the inherent restricted field of view, limited flexibility and control of conventional endoscopic devices, examination and treatment of body organs or cavity walls or the like has, heretofor, been limited to the more accessible main passageways of the body such as the upper or lower gastrointestinal or pulmonary tracts. Many indentures, folds or pocketed areas along said tracts and passageways leading therefrom have not been readily accessible, heretofor, to endoscopic examination or treatment without attempting the dangerous practice of probing without adequate physical and/or visual control of the probing end of such instruments.

The present invention has for a principal object, the provision of novel and improved means by which diagnosis and treatment of conditions in remote normally inaccessible passageways, body ventricles or organs or the like can be accomplished by endoscopic examining procedures under constant and accurate physical and visual control of the examining instrument and with an assurance of safety in the performance of the examination.

Another object is to provide, in part, a novel, flexible endoscopic probe having elongated flexible fiber optical light-conducting means for directing light through said probe and outwardly of the distal end thereof to illuminate an object or body part and to simultaneously return an optical image of said object or part reversely through said probe for observation, examination and/or treatment thereof.

Another object is to provide novel, remotely controlled adjustable means for forming and focusing an image of an illuminated object upon said light-conducting means at said distal end of said endoscopic probe.

Another object is to provide, in combination with said light-conducting means, a flexible channel extending longitudinally through said endoscopic probe which gives access lengthwise through said probe to areas under examination by the device of the invention, and further means for providing positive remote control of the position of the distal end of said probe to facilitate insertion of said probe through angulated passageways into said areas to be examined and to permit visual lateral exploration of said areas in all directions.

A further object is to provide novel means at the proximal end of said endoscopic probe for operating said image focusing means and said positional control means while simultaneously directly viewing images formed of the areas forwardly of and surrounding said distal end of said probe.

A still further object is to provide an instrumentation of the above character which, as a result of its unique combination of parts and unusual compact construction, provides versatile and highly desirable means for exploratory examinations, treatment, injection, sampling and/or aspiration of materials from areas internally of a body, any one of which or all of said operations being performable with a single insertion of said device into a particular body area to be diagnosed or treated.

Other objects and advantages of the invention will become apparent from the following description when taken in conjunction with the accompanying drawings in which:

FIG. 1 is a side elevational view of a preferred form of the invention shown in reduced scale and which is diagrammatically illustrated as being in a position of use;

FIG. 2 is an enlarged cross-sectional view taken on line 2—2 of FIG. 1;

FIGS. 3 and 4 are fragmentary cut-away side views of a portion of the device shown in FIG. 1 taken as if looking from the side thereof opposite to that shown in FIG. 1;

FIG. 5 is a perspective view of a portion of the distal end section of the device of the invention;

FIG. 6 is a longitudinal cross-sectional view of said distal end section; and

FIG. 7 is a transverse cross-sectional view taken on line 7—7 of FIG. 6 looking in the direction indicated by the arrows.

Referring more particularly to the drawings wherein like characters of reference designate like parts throughout the various views, a preferred form 10 of the invention is illustrated in FIG. 1 along with a diagrammatic representation of a body cavity 12 or the like which is shown to illustrate a function of the device 10.

As mentioned hereinabove, this invention relates to an endoscopic type of instrument and it, therefore, follows that the device 10 embodies an elongated section or probe 14 which is adapted to be inserted endwise into a body cavity or passageway to be examined and/or treated. In the present invention, the distal end portion 16 of the probe 14 is constructed so as to be laterally adjustable in all directions independently of the remaining extended length of the probe 14 and means is provided to operate the end 16 of the probe 14 from a location remote from the distal end 16 thereof as will be described in detail hereinafter. Further, in the probe 14 there is provided light-conducting means operating to conduct light from a remotely located source through the probe 14 to illuminate a selected portion of a body cavity 12 or the like and simultaneously conduct light forming an image of said portion of said cavity reversely through the probe 14 to an observation point adjacent the proximal end of the probe, there being means provided at the distal end 16 of the probe to form said image as will also be described in detail hereinafter.

Means for operating the laterally adjustable end 16 of the probe, directing light thereinto and for viewing the above-mentioned reversely conducted images is provided in a compactly designed unitary operating handle 20 into which the end 18 of the probe is inserted and operatively connected.

Referring now to the details of construction and operation of the various parts of the device 10, it will be seen by reference to the drawings that the probe 14 is flexible throughout the major portion of its length so as to be bendable in all directions between the locations of its connection with the operating handle 20 and the above-mentioned adjustable distal end portion 16. In order to permit this flexibility of the probe 14, the above-mentioned light-conducting means comprises an elongated flexible bundle 22 of light-conducting fibers 24 preferably formed of glass and each individually light-insulated to prevent the intermixing of light by passage from one fiber to another.

The fibers 24 are initially constructed preferably by drawing a rod-like assembly of light-conducting materials which comprises a core part of flint glass or the like having a relatively high index of refraction with a relatively thin coating or cladding thereon of relatively low index of refraction such as crown or soda lime glass or the like. While it is preferable to form the fibers 24 of glass, it should be understood that other cladded transparent plastic materials may be used. Furthermore, the individual fibers 24 may be formed so as to each embody a plurality of light-conducting channels by multiple drawing methods if such fibers are desired. Reference may be made to patent applications bearing Serial Nos. 717,035, 703,914 or 669,883, now Patent No. 2,992,516, for more complete details with regard to certain procedures used in the forming of some of the various types of light-conducting fibers.

The fibers are grouped together in disconnected side-by-side relation with each other throughout the major portion of the length of the probe 14 between its opposite ends 16 and 18 so as to be individually flexible and thereby, together as a disconnected group throughout the intermediate portion of their length, provide the probe 14 with a high degree of flexibility.

It is pointed out, however, that while the flexibility of the probe 14 is somewhat dependent upon the size of fibers used, actual control of the overall flexibility of the probe 14 is accomplished by wrapping the fiber bundle with a cloth or plastic tape 26 or the like (as shown in FIG. 1) throughout the areas where certain degrees of stiffening of the probe are desired. In this way, the portion of the probe adjacent its distal end may be thinly and/or loosely wrapped and progressively tighter and/or thicker wrappings may be used to increase the rigidity of the probe progressively toward its proximal end 18. Also, if it is desired, a proximal third of the length or so of the probe may be rendered relatively rigid by such wrapping or other means. It will become apparent hereinafter that further control of the overall flexibility of the probe 14 throughout its length may be accomplished by similarly wrapping the entire assembly of its various parts to be described more fully hereinafter or by proper selection of the material of the outermost tubing which is used to seal the inner parts of the probe also as will be described hereinafter.

The flexible fiber bundle 22 is bifurcated adjacent the end 18 of the probe 14 to form a pair of independently functioning light-conducting channels 28 and 30 which extend separately each into a different section of the operating handle 20 (see FIG. 3). The particular fibers 24 which make up the channels 28 and 30 are fused, bonded with cements or otherwise rigidly secured together in side-by-side relation with each other throughout a section thereof adjacent their terminal ends to prevent longitudinal slippage or displacement of their end faces during flexing of the probe 14 and to further provide correct imagery as will be pointed out hereinafter. The end faces 32 and 34 of the groupings of fibers which form the respective channels 28 and 30 are optically finished to render the fibers 24 highly receptive to the transfer of light into or out of the said channels, as the case may be.

In the particular arrangement of parts illustrated herein, it can be seen (FIG. 3) that the channel 28 is used to direct light through the probe 14 for purposes of illuminating an area under examination and the channel 30 is arranged to return an optical image of said area to provide for its observation. The channel 28 is directed slightly upwardly through an appropriate opening 36 internally of the handle 20 and terminated adjacent the innermost end of a lighting chamber 38. A removable lighting fixture 40 is provided to support a light bulb 42 in operatively electrically connected relation with a conventional plug-in type of electrical receptacle 46 which is permanently mounted as an integral part of the handle 20. Electrical leads 44 are used for this purpose. An extension cord 48 having a suitable connecting plug 50 may then be used to supply current to the bulb 42 when plugged into the receptacle 46 as shown in FIG. 3. It should be understood, however, that the handle may be designed to carry one or more dry cell batteries for use as a source of current for the bulb 42 if it is desired to render the device 10 completely portable and operable without the need of an outside source of electrical energy.

The bulb 42 is disposed relatively close to the end face 32 of the channel 28 which end face is optically finished. The glass envelope of the lamp is preferably silvered or otherwise coated so as to allow light to be emitted only through a clear portion at the end thereof which faces the end face 32 of the fiber light-conducting channel 28. The lighting chamber may be provided with vent openings 52 as shown or otherwise vented through the fixture 40 to dissipate the heat produced by operation of the bulb 42.

It is pointed out that with the lighting arrangement shown and described herein, burned out or defective bulbs 42 may be quickly and easily replaced by snapping the fixture 40 out of its illustrated position in the chamber 38. This gives immediate access to the bulb 42.

It is also pointed out that by placing the bulb 42 in the handle 20 and away from the portion of the probe 14 which is inserted in the body, undue heating of the body parts being examined is completely avoided and furthermore, the above-mentioned simple and quick bulb replacement feature of the device 10 avoids the necessity of removal and reinsertion of the probe instances where bulb failure occurs during use.

The light-conducting channel 30 which, as stated above, is used to receive and transmit images from the distal end 16 of the probe back to an observation point in the operating handle 20, is passed through a tubular supporting channel 54 and terminated slightly inwardly of the rear wall 56 of the handle 20. It will become apparent as this description progresses that an optical image transferred through the fibers of the channel 30 will be visible upon the end face 34 of the channel 30. In order to facilitate the viewing of this image, an eyepiece lens 58 is provided. The lens 58 is positioned in a mount 60 which is slidably adjustable in the tube 54 toward or away from end face 34 of the fiber optical channel 30 to permit the focusing of an enlargement of the image produced at the end face 34 into the eye of an observer. It should be understood that the image at the end 34 of the channel 30 may be viewed directly without the eyepiece if desired.

The fibers 24 which make up the respective light and image conducting channels 28 and 30 are grouped together within the handle cavity 62 and together pass outwardly in rather compactly bundled relation with each other through a tapered forwardly extending tubular section 64 of the handle 20. Between this point and a location adjacent the distal end 16 of the probe 14, the fibers 24 of both the channels 28 and 30 may be and generally are somewhat intermixed in their side-by-side relation with each other. As stated above, as they are only connected together adjacent their opposite terminal ends in similar geometrical arrangement, it should be clearly understood, however, that such an intermingling of the fibers 24 throughout the intermediate section of the probe 14 has no effect upon their individual function either as light carrying means or image carrying means since the fibers 24 are individually light-insulated from each other.

At the distal end 16 of the probe 14, the fibers 24 of the bundle 22 thereof are separated once again into their respective channels 28 and 30 (see FIG. 6). In this respect, all of the fibers 24, which at the proximal end of the probe 14 were used to make up the channel 30 shown in FIG. 3, are gathered together into substantially the same configuration of a tightly packed bundle, fused, cemented or otherwise fastened securely together in side-by-side relation with each other and fitted into a thin-walled tubular retaining member 65 (see FIG. 6). The end face 66 is optically finished as is its opposite end face 34 and for the same reason.

One important factor in the forming of the faces 66 and 34 at the opposite ends of the channel 30, however, relates to the geometrically arranged patterns of the fiber 24 ends themselves. In this respect, since the channel 30 is used as image transfer means, the fiber end faces 34 and 66 must be substantially identically geometrically patterned so that an image received at 66 will be similarly reproduced in its original form and with good definition at 34. The fabrication of such a coherent fiber bundle may be accomplished by various known techniques, one of which might be to form a round hoop of fibers having a circumferential dimension approximately equal to the length desired of the channel 30 and to secure the fibers together throughout a relatively short section of said hoop whereupon, by a single cut transversely through the said secured together section, the severance will produce opposite end faces having substantially identically geometrically arranged fiber end faces.

The fibers 24 of the bundle 22 which originate in the handle 20 as the light-conducting channel 28 are separated from the fibers of the channel 30 at the end 16 of the probe (see FIG. 6) and are placed circumferentially around the outer surface of the tubular member 65 as shown more in detail by FIG. 7. These fibers are also secured firmly together adjacent their opposite ends by fusion or cementing to prevent their longitudinal displacement when the probe 14 is flexed. It is pointed out, however, that no particular geometrical arrangement of the opposite end faces of the fibers in the channel 28 is required since said channel is used only for light-conducting purposes and not as image-transmitting means.

In FIG. 6 it can be seen that the end faces 68 of the fibers forming the channel 28 are optically finished and terminate adjacent the end of the tubular member 65 while the end face 66 of the channel 30 is disposed a substantial distance inwardly of the tubular member 65 to provide space in said tubular member for the placement of an adjustable image forming lens 70 and means for supporting and adjusting the same.

In order to close off the distal ends of the fiber optical channels so as to prevent body secretions or other foreign matter from contacting the fiber end faces and deterring the optical efficiency of the device 10 when in use, the end 16 of the probe is provided with a rigid hollow tubular end fitting 72 having a relatively thin transparent window 74 against which the fibers of the channel 28 abut.

The fiber optical portion of the probe 14 operates as follows: With the distal end 16 of the probe 14 inserted into a body cavity 12 or the like to be examined as illustrated in FIG. 1, light from the bulb 42 (see FIG. 3) is directed into the channel 28 and upon being conducted therethrough by the known principle of high internal reflection in each of the fibers 24, is emitted through the end faces 68 and through the transparent window 74 to illuminate the portion of the body cavity 12 toward which the end 16 of the probe is directed. The image forming lens 70 then functions, when adjusted to proper spaced relation with the fiber optical end face 66, to impose an image of the illuminated area of the cavity 12 upon said end face 66. The image forming light is then transferred through the channel 30 by internal reflection in each of the respective fibers thereof to the receiving face 34 whereupon it is viewed by the observer (see FIGS. 1 and 3).

In order to provide the image transfer system with a variable range of view so as to provide for clear and accurate viewing of object points at different distances from the end of the probe 14 without having to move or adjust the probe from a chosen position in the body, the imaging lens 70 (see FIG. 6) is mounted in an adjustable carrier 76 which is tubular and easily slidable within the confines of the space between the window 74 and the face 66 of the fiber optical channel 30. The carrier 76 is provided with a laterally extending lug part 78 which extends outwardly of the tubular member 64 through a guide slot 80 (see FIGS. 6 and 7). By means of the lug 78 the carrier 76 is actuated so as to move the lens 70 toward or away from the fiber optical face 66 in accordance with the distance between the end 16 of the probe 14 and the object plane to be viewed so as to locate the particular image plane of the lens at the plane of the face 66 and thereby produce a clear, in-focus image of said object upon the face 66 with the result that a clear, in-focus image of the object will be received and viewed at the end 34 of the channel 30.

The carrier 76 is actuated by a control wire 82 which is crimped, soldered or otherwise securely fastened at one of its ends to the lug 78. The wire 82 is of relatively small gage and preferably formed of tempered steel or the like such as piano wire and is extended along a side of the fiber bundle 24 throughout the length of the probe 14 into the operating handle where it is connected to one end of an eccentric operating lever 83 (see FIG. 3). It can be seen that rotation of the lever 83 by means of an outer operating handle 85 (see FIG. 1) will then push or pull the wire longitudinally and thereby produce the abovementioned sliding action of the lens carrier 76.

As mentioned hereinabove, the end 16 of the probe 14 is adjustable laterally in all directions independently of the remaining portion of the probe 14 and under direct control of the operator of the device 10. This is accomplished as shown more particularly in FIGS. 5 and 6 by the provision of a double gimbal construction which is connected to the end fitting 72.

The double gimbal construction comprises a first relatively short tubular part 84 of an outer diameter approximately equal to that of the end fitting 72 and having diametrically opposed extensions or leg parts 86 extending endwise outwardly from one end thereof and shaped to fit into the rearwardly directed open end of the fitting 72 where the said leg parts are pivotally connected to the fitting 72 at diametrically opposed points on the side wall thereof by pivot screws 88 or the like (see FIG. 5). On the part 84, a second pair of similar leg parts 90 extend endwise in a direction opposite to the leg parts 86 away from the main body section of the tubular part 84. The legs 90 are located diametrically opposite to each other but aligned along a diameter of the part 84 which is disposed normal to the diameter passing through the legs 86. The legs 90 are pivotally connected adjacent their terminal ends to a rigid tubular member 92 by means of pivot screws 94 or the like. Thus, it can be seen that by means of the intermediate part 84, universal movement of the end fitting 72 relative to the tubular part 92 can be accomplished.

The light-conducting bundle 22 extends through the tubular parts 84 and 92 of the double gimbal construction as shown in FIG. 5 and the gimbal is operated by control wires originating in the handle 20 so that an operator of the device 10 can orient the distal end 16 of the probe 14 in any desired direction relative to the main body portion of the flexible probe to direct the same safely through angulations or curves in passageways under examination while enjoying the benefit of straight ahead vision. Also, an operator may view different areas at one side or the other of a particular body part under observation by orienting the end 16 of the probe so as to point the same toward the particular area to be viewed.

In order to pivot the end fitting 72 about an axis extending through the pivot points 88, wires 96 and 98 are soldered or otherwise securely attached to the end fitting 72 adjacent its rearwardly directed open end at diametrically opposed points 100 and 102 respectively which points 100 and 102 are located in a meridian disposed normal to the direction of the axis through the pivot points 88. Thus it can be seen that by pulling back on the wire 96 and/or simultaneously pushing forward on the wire 98, the end fitting 72 will pivot at 88 and will be moved in one lateral sidewise direction as viewed in FIGS. 5 and 6. In a similar manner by reversing the action on the wires 96 and 98, the end fitting 72 will be moved in an opposite lateral sidewise direction as viewed in FIGS. 5 and 6. The wires 96 and 98, as in the case of the previously-mentioned wire 82, are preferably formed of a relatively stiff and durable material such as piano wire or the like and are of relatively small gage.

From the points of their connection with the end fitting 72, the wires 96 and 98 are each passed through one of a pair of hollow highly flexible woven wire cables or the like 104 and 106 which are nested in closely packed side-by-side relation with the flexible fiber optical bundle 22. It will also be noted that the above-described wire 82 is also directed through the cable 104. One end of each of the cables 104 and 106 is preferably soldered or otherwise securely attached to the above-described tubular part 94 to prevent longitudinal displacement of said cables when the probe 14 is flexed and the opposite ends of the cables 104 and 106 are fastened internally of the operating handle 20 by means of a clamp 108 (see FIGS. 3 and 4) for the same reason.

The wires 96 and 98, upon emerging from their respective cables in the handle 20, are fastened to an actuating lever 110 which is pivotally mounted upon a pivot post 112 within the internal cavity 62 of the operating handle 20. The lever 110 is, in turn, provided with a depending reduced end portion which is engaged within a slot 114 in a transversely extending operating rod 116. The operating rod 116 is placed in the pistol grip portion 118 of the handle 20 and extends from front to back therethrough in journals 120 with its intermediate portion passing freely through the internal cavity 62 of the handle 20. The journals 120 are of such a fit with the rod 116 as to permit the same to slide freely when pushed endwise. Thus, through the linkage with the lever 110, operation of the rod 116 causes the lever 110 to pivot about its connection 112. The wires 96 and 98 are connected to the lever 110 at points substantially equidistantly located, one at each side of its pivot point 112.

It can then be seen that by pushing the operating rod 116 the resultant pivoting of the lever 110 will cause an endwise pulling of one of the wires 96 or 98 and a simultaneously pushing of the other wire to pivot the end fitting 72 of the probe 14 about its pivot points 88 an amount in accordance with the extent of movement of the operating rod 116.

In order to provide for adjustment of the distal end 16 of the probe in a meridian normal to the axis of the pivot points 88, a second pair of wires 122 and 124 are securely attached to the rearwardly directed edge of the tubular part 84 of the double gimbal arrangement. The wires 122 and 124 are fastened at diametrically opposed points 126 and 128 respectively which are disposed in a meridian normal to the direction of the axis of the pivot points 94 so that by operation of the wires 122 and 124 in a manner identical to that described with relation to the wires 96 and 98, the end fitting 72 and tubular part 84 will move together as a unit in a sidewise direction as viewed in FIGS. 5 and 6. That is the said parts will pivot about the points 94.

The opposite ends of the wires 122 and 124 are fastened to a second operating lever 130 pivoted on the same pivot post 112 as is the lever 110. A short spacer 132 is placed between the levers 110 and 130 to prevent interference between their respective wires. The wires 122 and 124 extend through the cable 106 and are connected to the lever 130 at opposite sides of the pivot post 112 in a manner similar to the previously described wires 96 and 98.

Operation of the lever 130 is accomplished by means of a second push rod 134 in the pistol grip portion 118 of the handle 20. The rod 134 is identical in construction and function to the rod 116 and actuates a linkage 136 pivotally mounted at 138 in the handle cavity 62 which, in turn, by means of a swivel connection 140 solely connected with the lever 130 functions to actuate the lever 130 upon adjustment of the rod 134.

It can now be seen that by manipulation of the actuating rods 116 and 134 with the fingers, either simultaneously or one at a time, the distal end 16 of the probe can be adjusted in any direction laterally relative to the major portion of the probe 14 by pivoting at its gimbal connections.

In order to provide an access opening through the handle 20 and probe 14 by means of which aspiration, ventilation, injection and/or sampling of body fluid may be accomplished while the probe 14 is in a position of use within a body cavity or the like, a hollow tube 142 formed of a flexible plastic material or the like is extended throughout the entire length of the probe and nested closely in side-by-side relation with the fiber optical bundle 22 and the cables 104 and 106 throughout the major portion of the length of the probe 14.

At the distal end 16 of the probe, the tube 142 extends to the end opening 146 and terminates in substantially flush relation with the windowed end of the fitting 72.

At its opposite end, the tube 142 enters the cavity in the handle 20 through the section 64 thereof and is fitted onto a petcock 148 (see FIG. 3) of the type having three access ports, any two of which may be selectively placed in communicating relation with each other while closing off a third. The petcock 148 is of a conventional nature having a rotatable valve part 150 operated by a switching lever 152 (see FIG. 1) disposed outside the operating handle 20 of the device 10. The valve 150 is hollow in its center with two diametrically opposed openings 154 extending into the hollow center thereof and a third radial opening 156 having its axis disposed normal to the openings 154. Leading from the valve 150 and through the rear wall 56 of the operating handle 20 is a tubular port 158 of the petcock 148 which is in diametrically aligned relation with a similar tubular port 160 of the petcock 148 onto which the tube 142 of the probe 14 is connected. With the petcock valve 150 adjusted as shown in FIG. 3, a clear passageway is provided through the ports 158 and 160 of the petcock into the tube 142. Thus, a catheter or biopsy forceps or other devices may be passed through the petcock and tube 142 toward and outwardly of the distal end 16 of the probe 14.

With the probe 14 in a body cavity or the like, an operator of the device 10 will, by sighting into the eyepiece 58, have a clear view of the leading end of the catheter or biopsy forceps or the like as they emerge from the distal end 16 of the probe. Furthermore, by manipulation of the adjusting rods 116 and 118 to move the end 16 of the probe an operator can easily direct the leading end of the catheter or forceps or the like into or toward a desired location under constant visual control.

The petcock 148 has a third lead-off tube or passageway 164 which extends downwardly and outwardly of the base 166 of the handle 20 (see FIG. 3). This tubular passageway 164 can be utilized to force air into and through the tube 142 or to draw a vacuum in the tube 142 for purposes of sampling body fluids through the probe 14. By adjusting the petcock valve 150 with the switching lever 152, the opening through the tubular port 158 can be closed off and communication made between the tube 142 and passageway 164 through openings 154 and 156.

The composite grouping of the various above-mentioned cables 104 and 106, fiber optical bundle 22 and tube 142 which are nested closely together and form the elements of the probe 14 are covered by an outer flexible sheath 168 which may be formed of an electric rubberized material or any suitable tubing or wrapping which will protect the operating parts of the probe from body secretions and provide a smooth non-irritating covering.

It is to be understood that the device of the invention has considerable utility in the performance of many tests and examining procedures not discussed herein and is not restricted to any particular use in the medical profession. That is, it may be used as means to examine or perform other operative functions within networks of piping or similar arrangements having straight, curved or angulated passageways.

From the foregoing, it will be seen that simple, efficient and economical means has been provided for accomplishing all of the objects and advantages of the invention as expressed in the accompanying claims and the invention is not limited to the exact matters shown and described as only the preferred matters have been given by way of illustration.

Having described my invention, I claim:

1. A device of the character described comprising a probe embodying a long, thin and flexible tubular structure, a relatively short hollow fitting on said tubular structure at the distal end of said probe, annular hollow gimbal means pivotally joining said fitting and tubular structure so as to render said fitting laterally adjustable in all directions relative to and independently of the major portion of the length of said flexible tubular structure, a flexible fiber optical structure embodying a plurality of long and thin flexible light-conducting fibers extending internally of said tubular structure throughout the major portion of its length and internally through said gimbal means into said hollow fitting with the respective ends of said fibers in said fitting being directed substantially parallel to the axis of said fitting, certain of said fibers having their ends which are adjacent the proximal end of said probe being arranged to receive light to be transferred through said probe and emitted from the opposite ends of said certain fibers from within said fitting, the others of said fibers having their respective opposite ends intimately grouped together in corresponding geometrical patterns to provide respective composite fiber-optical image-receiving and emitting opposite end faces, a first pair of wire-like members extending longitudinally internally through said tubular structure and having respective adjacent ends thereof fixed to diametrically opposite sides of said hollow fitting in a first transverse meridian thereof with the opposite ends of said first pair of wire-like members being accessible adjacent the proximal end of said probe for manipulation to adjust said hollow fitting laterally in the direction of said first meridian independently of the major portion of the length of said flexible tubular structure, a second pair of wire-like members extending longitudinally internally through said tubular structure and having respective adjacent ends thereof fixed to diametrically opposite sides of said gimbal means in a transverse meridian thereof approximately normal to said first-mentioned meridian of said fitting and with opposite ends of said second pair of wire-like members also being accessible adjacent the proximal end of said probe for manipulation to adjust said hollow fitting and gimbal means together laterally in the direction of said second meridian independently of the major portion of the length of said flexible tubular structure whereby, with said first and second pairs of wire-like members, universal lateral adjustment of said hollow fitting may be effected from said proximal end of said probe independently of and without effecting movement of said flexible tubular structure from said proximal end of said probe to a point adjacent said fitting on said distal end of said probe.

2. A device of the character described comprising a probe embodying a long, thin and flexible tubular structure, a relatively short hollow fitting on one end of said tubular structure at the distal end of said probe, annular hollow gimbal means pivotally joining said fitting and tubular structure so as to render said fitting laterally adjustable in all directions relative to and independently of the major portion of the length of said tubular structure, a transparent window on the terminal end of said hollow fitting functioning to close said end, a flexible fiber optical structure embodying a plurality of long and thin flexible light-conducting fibers extending internally of said tubular structure throughout the major portion of its length and internally through said gimbal means into said hollow fitting with the respective ends of said fibers in said fitting being directed toward said window with the ends of certain of said fibers located adjacent the inner side of said window, said certain of said fibers having their ends which are adjacent the proximal end of said probe being arranged to receive light to be transferred through said probe and emitted from the opposite ends of said fibers and forwardly through said window, the others of said fibers having their respective opposite ends intimately grouped together in corresponding geometrical patterns to provide respective composite fiber optical image-receiving and emitting opposite end faces with said image-receiving face disposed within said hollow fitting and spaced from said window, image-forming lens means between said image-receiving face and said window, adjustable lens-carrying means internally of said hollow fitting for supporting said lens means and arranged to permit adjustment of the same toward and away from said image-receiving face to focus images thereupon, an elongated wire-like member internally of said tubular structure, gimbal means and hollow fitting extending longitudinally thereof and having one of its ends attached to said lens-carrying means, the opposite end of said wire-like member being accessible at said proximal end of said probe for manipulation thereof to adjust said lens means toward and away from said image-receiving face of said fiber optical structure, a first pair of other wire-like members extending longitudinally internally through said tubular structure and having respective adjacent ends thereof fixed to diametrically opposite sides of said hollow fitting in a first transverse meridian thereof with the opposite ends of said first pair of wire-like members being accessible adjacent the proximal end of said probe for manipulation to adjust said hollow fitting laterally in the direction of said first meridian independently of the major portion of the length of said flexible tubular structure, a second pair of wire-like members extending longitudinally internally through said tubular structure and having respective adjacent ends thereof fixed to diametrically opposite sides of said gimbal means in a transverse meridian thereof approximately right-angularly related to said first-mentioned meridian of said fitting and with the opposite ends of said second pair of wire-like members also being accessible adjacent the proximal end of said probe for manipulation to adjust said hollow fitting and gimbal means together laterally in the direction of said second meridian independently of the major portion of the length of said flexible tubular structure whereby with said first and second pairs of wire-like members universal lateral adjustment of said hollow fitting may be effected from said proximal end of said probe independently of and without effecting movement of said tubular structure from said proximal end of said probe to a point adjacent said fitting on said distal end of said probe.

3. A device of the character described comprising a probe embodying a long, thin and flexible tubular structure, a relatively short hollow fitting on said tubular structure at the distal end of said probe, annular hollow gimbal means pivotally joining said fitting and tubular structure so as to render said fitting laterally adjustable in all directions relative to and independently of the major portion of the length of said flexible tubular structure, a flexible fiber optical structure embodying a plurality of long and thin flexible light-conducting fibers extending internally of said tubular structure throughout the major portion of its length and internally through said gimbal means into said hollow fitting with the respective ends of said fibers in said fitting being directed substantially parallel to the axis of said fitting, certain of said fibers having their ends which are adjacent the proximal end of said probe being arranged to receive light to be transferred through said probe and emitted from the opposite ends of said certain fibers from within said fitting, the others of said fibers having their respective opposite ends intimately grouped together in corresponding geometrical patterns to provide respective composite fiber-optical image-receiving and emitting opposite end faces, a handle on the proximal end of said probe, said handle having a hollow interior into which said flexible fiber optical structure is extended, means within said handle for illuminating said light-receiving ends of said certain of said fibers, and means permitting said image-emitting end face formed by the others of said fibers to be viewed from outside of said handle, a first pair of wire-like members extending longitudinally internally through said tubular structure and having respective adjacent ends thereof fixed to diametrically opposite sides of said hollow fitting in a first transverse meridian thereof with the opposite ends of said first pair of wire-like members adjacent the proximal end of said probe being extended into said handle, first lever means pivotally mounted internally of said handle to which said opposite ends of said first pair of wire-like members are connected in such manner as to be moved simultaneously longitudinally in opposite directions to each other upon pivoting of said first lever means, a first lever-operating member extending externally of said handle and having a part connected with said first lever means for operating said lever means to adjust said hollow fitting at said distal end of said probe laterally in the direction of said first meridian independently of the major portion of the length of said flexible tubular structure, a second pair of wire-like members extending longitudinally internally through said tubular structure and having respective adjacent ends thereof fixed to diametrically opposite sides of said gimbal means in a transverse meridian thereof approximately normal to said first-mentioned meridian of said fitting and with opposite ends of said second pair of wire-like members also being extended into said handle, second lever means pivotally mounted internally of said handle to which said opposite ends of said second pair of wire-like members are connected in such manner as to be moved simultaneously longitudinally in opposite directions to each other upon pivoting of said second lever means, a second lever-operating member in said handle linked to said second lever means and having a part extending externally of said handle for operating said second lever means to adjust said hollow fitting at said distal end of said probe laterally in the direction of said second meridian independently of the major portion of the length of said flexible tubular structure whereby, through manipulation of said first and second lever-operating members at said handle, universal lateral adjustment of said hollow fitting may be effected by movement of said first and second pairs of wire members independently of and without effecting movement of said flexible tubular structure from said proximal end of said probe to a point adjacent said fitting on said distal end of said probe.

4. A device of the character described comprising a probe embodying a long, thin and flexible tubular structure, a relatively short hollow fitting on one end of said tubular structure at the distal end of said probe, annular hollow gimbal means pivotally joining said fitting and tubular structure so as to render said fitting laterally adjustable in all directions relative to and independently of the major portion of the length of said tubular structure, a transparent window on the terminal end of said hollow fitting functioning to close said end, a flexible fiber optical structure embodying a plurality of long and thin flexible light-conducting fibers extending internally of said tubular structure throughout the major portion of its length and internally through said gimbal means into said hollow fitting with the respective ends of said fibers in said fitting being directed toward said window with the ends of certain of said fibers located adjacent the inner side of said window, said certain of said fibers having their ends which are adjacent the proximal end of said probe being arranged to receive light to be transferred through said probe and emitted from the opposite ends of said fibers and forwardly through said window, the others of said fibers having their respective opposite ends intimately grouped together in corresponding geometrical patterns to provide respective composite fiber-optical image-receiving and emitting opposite end faces with said image-receiving face disposed within said hollow fitting and spaced from said window, image-forming lens means between said image-receiving face and said window, adjustable lens-carrying means internally of said hollow fitting for supporting said lens means and arranged to permit adjustment of the same toward and away from said image-receiving face to focus images thereupon, an elongated wire-like member internally of said tubular structure, gimbal means and hollow fitting extending longitudinally thereof and having one of its ends attached to said lens-carrying means, a handle on the proximal end of said probe, said handle having a hollow interior into which said flexible fiber optical structure is extended, means within said handle for illuminating said light-receiving ends of said certain of said fibers, and means permitting said image-emitting end face formed by the others of said fibers to be viewed from outside of said handle, said wire-like member being extended through said proximal end of said probe into said hollow interior of said handle, means within said handle and having a part extending outwardly thereof for moving said wire-like member longitudinally to adjust said lens means toward and away from said fiber optical image-receiving face, a first pair of wire-like members extending longitudinally internally through said tubular structure and having respective adjacent ends thereof fixed to diametrically opposite sides of said hollow fitting in a first transverse meridian thereof with the opposite ends of said first pair of wire-like members adjacent the proximal end of said probe being extended into said handle, first lever means pivotally mounted internally of said handle to which said opposite ends of said first pair of wire-like members are connected in such manner as to be moved simultaneously longitudinally in opposite directions to each other upon pivoting of said first lever means, a first lever-operating member extending externally of said handle and having a part connected with said first lever means for operating said lever means to adjust said hollow fitting at said distal end of said probe laterally in the direction of said first meridian independently of the major portion of the length of said flexible tubular structure, a second pair of wire-like members extending longitudinally internally through said tubular structure and having respective adjacent ends thereof fixed to diametrically opposite sides of said gimbal means in a transverse meridian thereof approximately normal to said first-mentioned meridian of said fitting and with opposite ends of said second pair of wire-like members also being extended into said handle, second lever means pivotally mounted internally of said handle to which said opposite ends of said second pair of wire-like members are connected in such manner as to be moved simultaneously longitudinally in opposite directions to each other upon pivoting of said second lever means, a second lever-operating member in said handle linked to said second lever means and having a part extending externally of said handle for operating said second lever means to adjust said hollow fitting at said distal end of said probe laterally in the direction of said second meridian independently of the major portion of the length of said flexible tubular structure whereby, through manipulation of said first and second lever-operating members at said handle, universal lateral adjustment of said hollow fitting may be effected by movement of said first and second pairs of wire members independently of and without effecting movement of said flexible tubular structure from said proximal end of said probe to a point adjacent said fitting on said distal end of said probe.

5. A device of the character described comprising a probe embodying a long, thin and flexible tubular structure having a relatively short hollow fitting on one end thereof and a long, thin flexible fiber optical structure formed of a plurality of flexible light-conducting fibers extending internally through said tubular structure into said fitting, gimbal means interjoining said fitting and tubular structure for permitting lateral adjustment of said fitting in all directions independently of the major portion of the length of said tubular structure, first and second pairs of wire-like members extending in adjacent side-by-side relation with each other longitudinally through said tubular structure along a common side of said fiber optical structure with the respective ends of said wire-like members separated adjacent said hollow fitting and connected in pairs to substantially right-angularly related diametrically opposite sides of said respective fitting and gimbal means, the opposite ends of said wire-like members being accessible for manipulation adjacent the opposite end of said tubular structure whereby longitudinal movement of one wire-like member relative to the other of each of the respective pairs thereof will produce lateral adjustment of said hollow fitting independently of said tubular structure and because said wire-like members are in adjacent side-by-side relation along a common side of said fiber optical structure flexing of said tubular and fiber optical structures may be effected substantially without introducing relative longitudinal movement of said wire-like members or imparting lateral movement of said hollow end fitting.

References Cited in the file of this patent
UNITED STATES PATENTS

| | | |
|---|---|---|
| 1,670,175 | Wikoff | May 15, 1928 |
| 2,532,043 | Wallace | Nov. 28, 1950 |
| 2,632,801 | Donaldson | Mar. 24, 1953 |
| 2,641,977 | Uji | June 16, 1953 |
| 2,764,149 | Sheldon | Sept. 25, 1956 |
| 2,783,757 | Scholz | Mar. 5, 1957 |
| 2,877,368 | Sheldon | Mar. 10, 1959 |
| 2,975,785 | Sheldon | Mar. 21, 1961 |
| 3,010,357 | Hirschowitz | Nov. 28, 1961 |
| 3,012,463 | Krivit | Dec. 12, 1961 |

FOREIGN PATENTS

| | | |
|---|---|---|
| 1,123,371 | France | June 11, 1956 |

OTHER REFERENCES

Kapany article in the book "Concept of Classical Optics" by Strong and published by W. H. Freeman & Co. Inc., 1958, pp. 565–566. (Copy in 88–LCR, Div. 7.)